Figure 1:
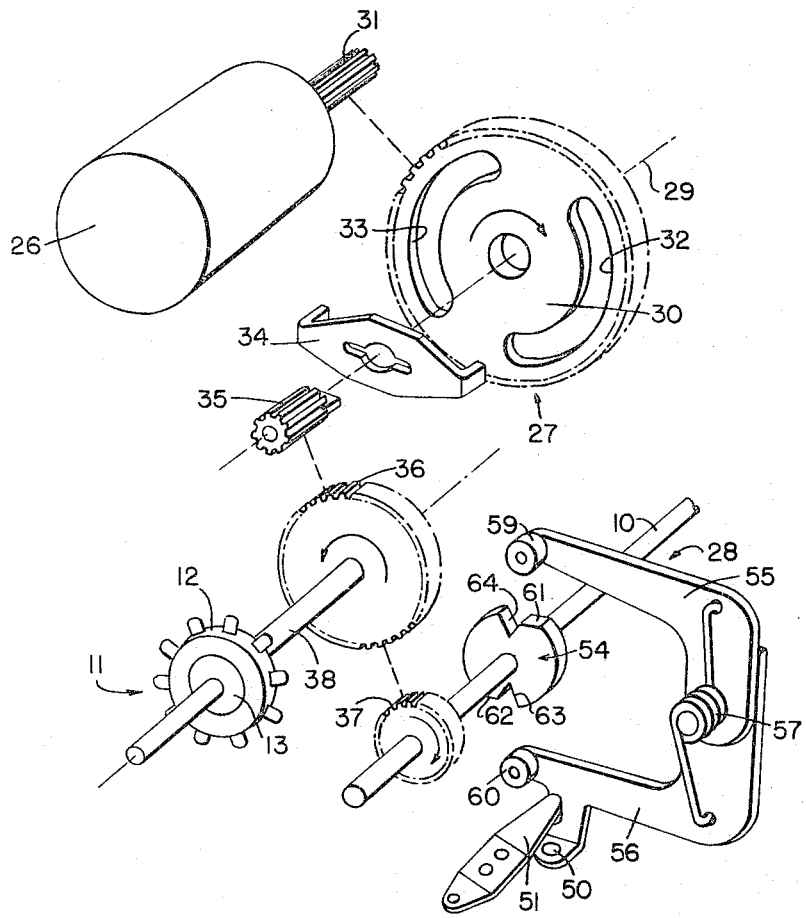

Jan. 24, 1967   D. F. WILLMANN   3,300,011

TUNING SHAFT POSITIONING SYSTEM

Filed Aug. 9, 1965   2 Sheets-Sheet 1

INVENTOR.
DONALD F. WILLMANN

BY
ATTORNEY.

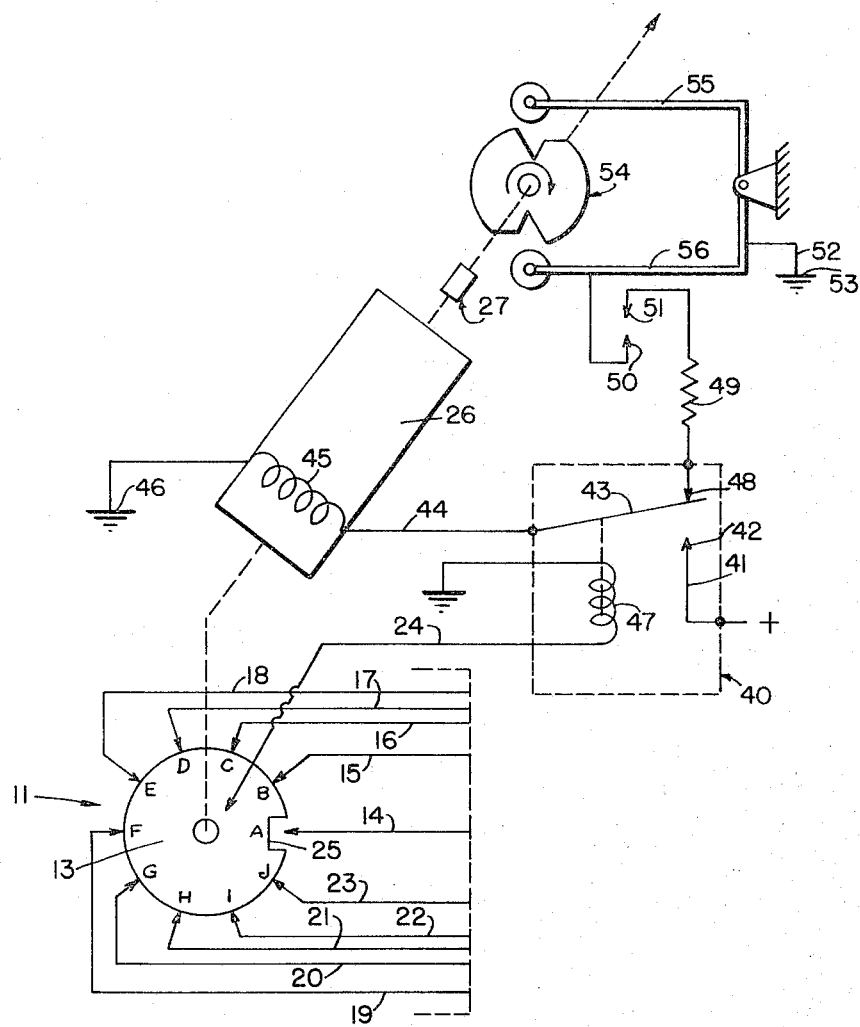

ium Patent Office
3,300,011
Patented Jan. 24, 1967

3,300,011
TUNING SHAFT POSITIONING SYSTEM
Donald F. Willmann, Cincinnati, Ohio, assignor to Avco Corporation, Cincinnati, Ohio, a corporation of Delaware
Filed Aug. 9, 1965, Ser. No. 478,258
5 Claims. (Cl. 192—142)

The present invention relates to means for precisely positioning a rotatably mounted driven element 10. The invention is of particular utility in the tuning of electronic communications equipment, which in the most complex systems requires precise positioning of a tuning shaft in any one of a substantial number of ordered positions. These positions may be selected by a command switch or the like, not shown herein because such command devices are well known to those of ordinary skill in the art.

The problems involved in accomplishing precise positioning and raised by inertia, blacklash, friction, and the like are old problems in the art, and various means for solving those problems have been devised. An object of the present invention is to provide an improved precise positioning system which involves the steps of bringing a rotatable element 10 substantially into an ordered position by a principal driving means 26, 31, then arresting that driving means and bringing it precisely into the ordered position by a secondary drive means 28 independent of the principal driving means.

The invention is of utility in step-type rotational drives generally, and it accomplishes a high order of accuracy with freedom from backlash and high speed of response.

For a better understanding of the invention, together with other and further objects, advantages, and capabilities thereof, reference is made to the following description of the appended drawings, in which:

FIG. 1 is a perspective and exploded view showing the elements of the combination in accordance with the invention in their relationships to each other; and FIG. 2 is a circuit diagram, generally in schematic form, showing the electrical circuitry of the novel combination in accordance with the invention, together with certain of the principal mechanical elements.

Referring now to the drawings, there is provided in accordance with the invention the combination illustrated in FIGS. 1 and 2. The invention operates in such a manner that the rotatably mounted driven element or output shaft 10 is angularly positioned with precision. This may be the shaft of a tuner, for example. In the particular illustrative embodiment of the invention herein shown, the output shaft 10 is subject to be ordered to any one of ten positions between zero degrees and 1800 degrees. In other words, there are ten possible ordered positions of shaft 10, 180 degrees apart.

The position of the shaft is dictated by selector means generally indicated by the reference numeral 11. This selector means comprises a rotor 13 and a stator 12 including ten sets of contacts in positions A–J and definitive of ten possible output-shaft-position orders. One contact of each pair is included in one of the branches of a relay energizing circuit later discussed; that is, one contact of each of the pairs of contacts in positions A–J is connected to its respective one of branch lines 14–23. A command switch (which may be a single-pole multiple-position rotary switch, not shown) gives an order by connecting the desired one of the branches 14–23 to one terminal of a source of electric current (not shown), so that current may be passed through that branch, then through the selected set of contacts associated with that branch, and then through the conductive rotor 13 and finally through a common conductor 24 for the purpose, as will be shown, of energizing a relay 40 which causes a motor 26 to run. The motor drives the rotor or follow-up element 13 in such a direction that the selected pair of contacts on the stator is opened by a suitable formation 25 in the rotor, as the order is complied with.

It will be understood from the foregoing that the selector device 11, here shown, is a follow-up device which contains selecting elements—i.e., the switch contacts in positions A–J, angularly displaced from each other—and a follow-up or response element—i.e., rotor 13, which turns in such a direction that the selected contacts are opened when the command or order has been complied with.

The selector 11 defines ten positions A–J, 36 degrees apart. Since the selector rotor 13 is geared through a 1 to 5 speed ratio system (FIG. 1) to the driven element or output shaft 10, it will be understood that the shaft 10 is controlled by the mechanism in accordance with the invention to assume ten positions between zero degrees and 1800 degrees. This discussion postulates that the zero degree position of the output shaft 10 corresponds to the A position of the rotor 13. The 180 degree position of the output shaft 10 therefore corresponds to the B position of the rotor 13, and so on. Finally, the J position of the rotor 13 corresponds to the 1620 degree position of the output shaft 10. That is to say, a command on selector 11 changing by 324 degrees from position A to position J (as by selecting the contacts in the J position and energizing line 23) will cause the output shaft 10 to turn clockwise four and one-half times. The invention operates in such a manner as to position the output shaft 10 with great precision.

The desired precision is accomplished by the method of, first, bringing the output shaft 10, by motor drive, approximately into the desired or ordered position; and, second, sensing that the ordered position is approximated and braking the motor drive and then forcing the driven element 10 into the precise ordered final position by means not subject to either substantial inertia or backlash. A degree of rotational freedom between the element 10 and the driving motor 26 is permitted by intercoupling them loosely via a free play means 27 which operates in such a manner that, just before the driven element 10 is positioned with precision, the driving element 26 is completely arrested.

The driving means includes a source of motive power or direct current magnet motor 26, having an output gear 31. The driving means 26, 31 is loosely coupled to the driven element 10 through coupling means 27 and gears later described herein. This coupling means comprises, all mounted on a suitable shaft 29, the following: first, a take-up gear 30, enmeshed with gear 31 and formed with two opposing slots or raceways 32 and 33; second, a fork 34 having projections extending into the slots 32 and 33 and adapted to be relatively rotatable therewithin, to the extent that free play is allowed; and, third, a gear 35 secured to the fork 34. The motion train further comprises a gear 36, on shaft 38, which meshes with the gear 35, and a gear 37 which meshes with gear 36 and is on the output shaft 10.

While the parameters herein mentioned are provided by way of illustration and not of limitation, the speed ratio between shaft 38, on which gear 36 is mounted, and the output shaft 10 is 1 to 5, the turning rate of shaft 10 is 370 revolutions per minute and that of gear 31 is 17,000 revolutions per minute. It will accordingly be understood that the gears 31, 30, 35 and 36 provide a large speed reduction in excess of 230.

Secured to shaft 38 is the rotor 13, which contains a circuit-opening formation 25 turnable with the shaft 38 in such a way as to sense that the synchronized shaft 10 has, to a gross approximation, reached the ordered position. That is to say, when the circuit-opening formation 25 reaches a position such as position B, it is then sensing that the output shaft 10 is at approximately its 180 degree position, whereupon this circuit-opening formation 25 opens its associated branch 15 of the energizing circuit of the relay 40 by means presently described, to stop the motor 26.

Relay 40 is a binary device which has two states. It is essentially a single-pole, double-throw switch. In one state a motor-energizing circuit is closed by the relay. In the other state a motor-braking circuit is set up or enabled by the relay. This braking circuit is set up only when the output shaft 10 position approaches and grossly approximates its ordered position. Specifically, the motor winding circuit may be traced from ground 46 through motor winding 45 and conductor 44 to the movable contact 43 of the relay 40. As a command is given and when relay coil 47 is energized through the selector device and conductor 24, then the motor 26 is placed in circuit with an energizing circuit, via the movable contact 43 of the relay, conductor 41, and the positive terminal of a suitable source of current (not shown). On the other hand, when the position of rotor 13 indicates that a command has been complied with, then the relay 40 assumes its other state and "drops out" to set up or enable a motor-braking circuit. That is, movable contact 43 rotates over to fixed contact 48, which is in series with a protective resistor 49, a pair of normally open contacts 50 and 51, and a conductive path 52 to ground 53. When the braking circuit so set up is closed, as will later be described herein, the motor winding 45 is short-circuited and the motor is braked or arrested.

It will be understood from the foregoing description that the sequence of operation of this combination is as follows: relay-energizing current is applied to the relay 40 (from a source of current and a command switch, not shown) via a selected one of the conductors 14–34, rotor 13, common conductor 24, relay winding 47, and ground, whereby the relay 40 is actuated to close contacts 42, 43, completing the motor circuit. The motor, running at approximately 17,000 revolutions per minute, drives the mechanism until the formation 25 on the selector rotor 13 reaches the selected position. Let position B be assumed to be the selected position. At this time the output shaft 10 will have turned clockwise by approximately 180 degrees and will be approaching its ordered position. Formation 25 breaks the energizing circuit to the relay 40, which then drops out, so that movable contact 43 touches fixed contact 48 and enables or sets up the braking circuit for the motor. By means presently to be described, the circuit so enabled is closed by the closing of contacts 50, 51, and the motor is arrested. By reason of the operation of said means now to be described, the output shaft is then positioned with precision. The discussion now turns to the means by which this is accomplished.

The invention includes precision positioning means generally designated by the reference numeral 28, independent of the driving means 26, 31, for sensing approach of the driven element 10 to any potentially ordered position. The rotor circuit-opening formation 25 senses a grossly approximated approach to the actually ordered position. The precision positioning means 28 senses a grossly approximated approach to any potentially ordered position. The means 28 is responsive to two events—i.e., that approach, and the enabling of the braking circuit (which occurs on approach of the driven element to the actually ordered position)—to precisely position the driven element 10 in its ordered position. The precise positioning means comprises a cam 54 which is mounted on the output shaft 10, together with a cam follower which is here shown as a spring-biased clamp having an upper jaw 55 and a lower jaw 56, both swingably mounted. A torsion spring 57 urges the jaws together. At the ends of the jaws are mounted rollers 59 and 60, which are pressed against the contours of the periphery of the cam 54, whereby the clamp is essentially a spring-biased cam follower. The cam 54 is formed with switch actuating surfaces 61 and 62, which are so formed as to permit closure of the contact elements 50 and 51, contact element 50 being mounted on jaw 56.

Let it be assumed for purposes of discussion that the output shaft is turning clockwise and cam 54 is on the threshold of its ordered position. At this phase of the cycle roller 60, being in contact with surface 62, exerts pressure thereagainst. This surface is formed with a lead which extends radially inwardly toward the direction of trail and terminates in a notch 63 converging toward the central axis of the cam. Jaw 56 moves in a closing direction, bringing contact 50 up against contact 51, thereby closing the motor-braking circuit and stopping the motor. The force of roller 60, then continuing to exert thrust against cam surface 62, drives cam 54 and output shaft 10 toward the precise ordered position, which is attained when the roller 60 drops into the notch at the trailing end of the surface 62, this notch being designated by the reference numeral 63. Simultaneously the spring-urged roller 59 drops into notch 64 to aid in the precise positioning and final arrest of the output shaft 10. The motor-braking action occurred when contacts 50 and 51 were brought into engagement to close the braking circuit, because the braking circuit had already been set up or enabled due to the dropping out of the relay 40. The driving motor 26 stopped before the rollers 59 and 60 dropped into their respective notches. This is made possible by the operations now described.

As the motor 26 is driving the fork 34, the projections on the fork are at the counterclockwise extremes of the raceways 32 and 33 in the take-up gear 30. As the motor is arrested and the precise positioning action is taken over by the means 28, the projections on the fork slide relatively clockwise in the slots 32 and 33. That is, the slippage in the coupling means 27 permits the final detent-type precise positioning independent of the motor drive.

In the particular embodiment shown, the cam 54 is formed with two switch-actuating surfaces 61 and 62 and two positioning surfaces or notches 63 and 64 to provide for precise positioning in 180 degrees steps, However, it is within the scope of the invention to provide more than two pairs of surfaces, such as 61, 64 and 62, 63 for smaller steps. And the invention is obviously adapted to 360 degree steps of the output shaft, if only one pair of surfaces such as 62, 63 is provided.

It will be noted that the switch-actuating surfaces 61 and 62 sense any potentially ordered position of the output shaft, in that they operate, and operate in conjunction, every 180 degrees of rotation of the output shaft. However, the complete arrest of the cam 54 only occurs when an actual compliance with an order is sensed and a close approach of the shaft 10 to its actually ordered position is accomplished, because it is only then that the braking circuit to the motor operates. That is, the independent positioning means 28 is effective to stop the output shaft only when the motor 26 is being braked. The motor stops very quickly, and in one successful embodiment of the invention which was actually reduced to practice the motor stops within four turns after formation 25 caused the relay 40 to drop out.

While there has been shown and described what is at present considered to be preferred embodiment of the invention, it will be understood by those skilled in the art that various changes and modifications may be made therein without departing from the scope of the invention as defined by the appended claims.

I claim:
1. The combination of:
   a driven element rotatably mounted to be angularly positioned with precision;
   driving means;
   coupling means including a loosely engaged clutch for coupling the driving means to the driven element;

selector means including means for ordering an angular position and a response element synchronized with the driven element;

binary means including an energizing circuit and a braking circuit having a switching element, said binary means having two states and controlled by the selector means to assume one state for closing the energizing circuit so that the driving means drives the driven element toward the position ordered by the selector means;

said binary means assuming its other state upon completion of response by the response element to enable said braking circuit and to open said energizing circuit;

and precision positioning means, independent of the driving means, for sensing an approach of the driven element to a potentially ordered position, said precision positioning means being responsive to the enabling of said braking circuit and said approach to actuate said switching element to close the braking circuit and to stop the driving means and to precisely position said driven element in its ordered position, said precision positioning means comprising:
a cam, mounted on a common shaft with the driven element,
and a cam follower,
said cam having switch-actuating surfaces and said cam follower actuating the switching element of the braking circuit, whereby on the approach to the ordered position of the driven element said cam follower closes said braking circuit,
said cam further having positioning surfaces effective, on braking of the driving means, to be engaged by the cam follower to arrest the driving means precisely in its ordered position.

2. In combination, a rotatably driven cam;

electrical means for driving said cam approximately to an ordered position, said electrical means comprising a motor and energizing circuitry, deenergizing circuitry including a switch comprising a first pair of normally open contacts for arresting the driving means, such arresting of the driving means occurring by reason of closure of said contacts;

said cam having on its periphery a first surface comprising a depressed portion inclined radially toward the direction of trail and a terminal portion in the form of a notch converging toward the axis of said cam, a cam follower exerting a thrust against said periphery, one of said contacts being carried by said cam follower and the cam follower displacing said one contact into closure with the other contact and then urging the cam to its finally ordered position as the cam follower moves in its direction of thrust against said surface upon approach of the cam to the ordered position, and free play means between the cam and the electrical means for driving the cam.

3. The combination in accordance with claim 2 in which the cam has at least a second functionally and structurally like surface peripherally spaced from said first surface, and means including a relay having a second pair of contacts in circuit with said first pair for making the arrest of the driving means, initiated by the displacement of the cam follower accompanying its thrust against said surfaces, conditional on the approach of the cam to its precisely ordered position.

4. In a positioning system of the type which includes driving means, electrical means for giving a positional order and sensing compliance with said order, and braking means set up on compliance with said order to arrest the driving means upon actuation, the improvement which comprises, in combination:

a rotatably mounted cam constituting the driven element to be positioned, said cam having a plurality of spaced actuating and positioning surfaces comprising a leading portion of such contour as to be driven by the cam follower and a trailing portion of such contour as to define a precise rotational position of said cam;

a cam follower for exerting thrust against said surfaces and moving radially to actuate said braking means and precisely to position said cam;

and means for introducing mechanical play between the driving means and said cam to make the precise positioning independent of the driving means.

5. The combination in accordance with claim 4 in which the cam follower comprises a pair of jaws spaced in accordance with the angular displacement between said surfaces, and spring means for urging said jaws together, said jaws then engaging said trailing portions.

References Cited by the Examiner

UNITED STATES PATENTS

| 2,610,720 | 9/1952 | Merles | 192—142 |
| 2,754,697 | 7/1956 | Luebking | 192—142 X |
| 3,031,054 | 4/1962 | Thumim | 192—142 |
| 3,268,047 | 8/1966 | Grygera et al. | 192—144 |

DAVID J. WILLIAMOWSKY, *Primary Examiner.*

ARTHUR T. McKEON, *Examiner.*